US005818815A

United States Patent [19]

Carpentier et al.

[11] Patent Number: 5,818,815

[45] Date of Patent: Oct. 6, 1998

[54] METHOD AND AN APPARATUS FOR SHAPING THE OUTPUT TRAFFIC IN A FIXED LENGTH CELL SWITCHING NETWORK NODE

[75] Inventors: Regis Carpentier, Fargues-St-Hilaire; Rene Glaise, Nice; Francois Kermarec; Thanh Pham, both of Antibes, all of France

[73] Assignee: International Business Machines Corporation, Armonk, N.Y.

[21] Appl. No.: 530,686

[22] Filed: Sep. 19, 1995

[30] Foreign Application Priority Data

Sep. 19, 1994 [EP] European Pat. Off. .............. 94480086

[51] Int. Cl.[6] ..................... H04L 12/56

[52] U.S. Cl. ........................ 370/218; 370/395; 370/418

[58] Field of Search ..................... 340/825.5, 825.51; 370/217, 218, 252, 235, 389, 395, 412, 417, 418, 428, 429

[56] References Cited

U.S. PATENT DOCUMENTS

| | | | |
|---|---|---|---|
| 5,253,247 | 10/1993 | Hirose et al. | 370/14 |
| 5,515,363 | 5/1996 | Ben-Nun et al. | 370/17 |
| 5,519,689 | 5/1996 | Kim | 370/17 |
| 5,533,009 | 7/1996 | Chen | 370/17 |

FOREIGN PATENT DOCUMENTS

| | | | |
|---|---|---|---|
| 2694671 | 6/1992 | France | H04L 5/22 |

OTHER PUBLICATIONS

SARA Chipset Technical manual, Document #TXC–95000, Ed. 2, Nov. 1992, TransSwitch Corp.: "ATM Adaptation Layer" pp. 1–7 to 1–8; Chapter 2: SARA Functional Description, pp. 2–1 to 2–8; Chapter 6: SARA–S Software Interfaces, pp. 6–1 to 6–9.

Globecom '93 vol. 3, Dec. 1993, Houston US pp. 1844–1848 G. Marino et al "A hardware Platform for B–ISDN Services Multiplexing: design and performances of AAL and ATM layers".

Supercomm/ICC '94 May 1994, New Orleans US pp. 106–110 A Baiocchi et al "Worst Deterministic Pattern Allocation: a viable approach to attain statistical gain in ATM".

*Primary Examiner*—Alpus H. Hsu
*Attorney, Agent, or Firm*—Gerald R. Woods

[57] ABSTRACT

A method and an apparatus for shaping the output traffic in the transmit part of a network node adapter. The network node supports fixed length cell switching user information traffic between a source unit and a destination unit. The method and apparatus use two lookup tables called an active and a standby calendar per output line. Each entry in the calendars represents the position of one cell in the output cell stream. Three parameters tables are used to store the information on user traffic in the descending order of the user bandwidth share negotiated at traffic establishment time for the calendars. The active calendar is continuously read by a transmit device and the corresponding cells are sent onto the output line. Under control of a control device, a placement device places entries in the standby calendar reserved as changes occur in the traffic. Once filled up, the standby calendar is swapped to the active calendar and is read by the transmit device.

15 Claims, 13 Drawing Sheets

Figure 7:
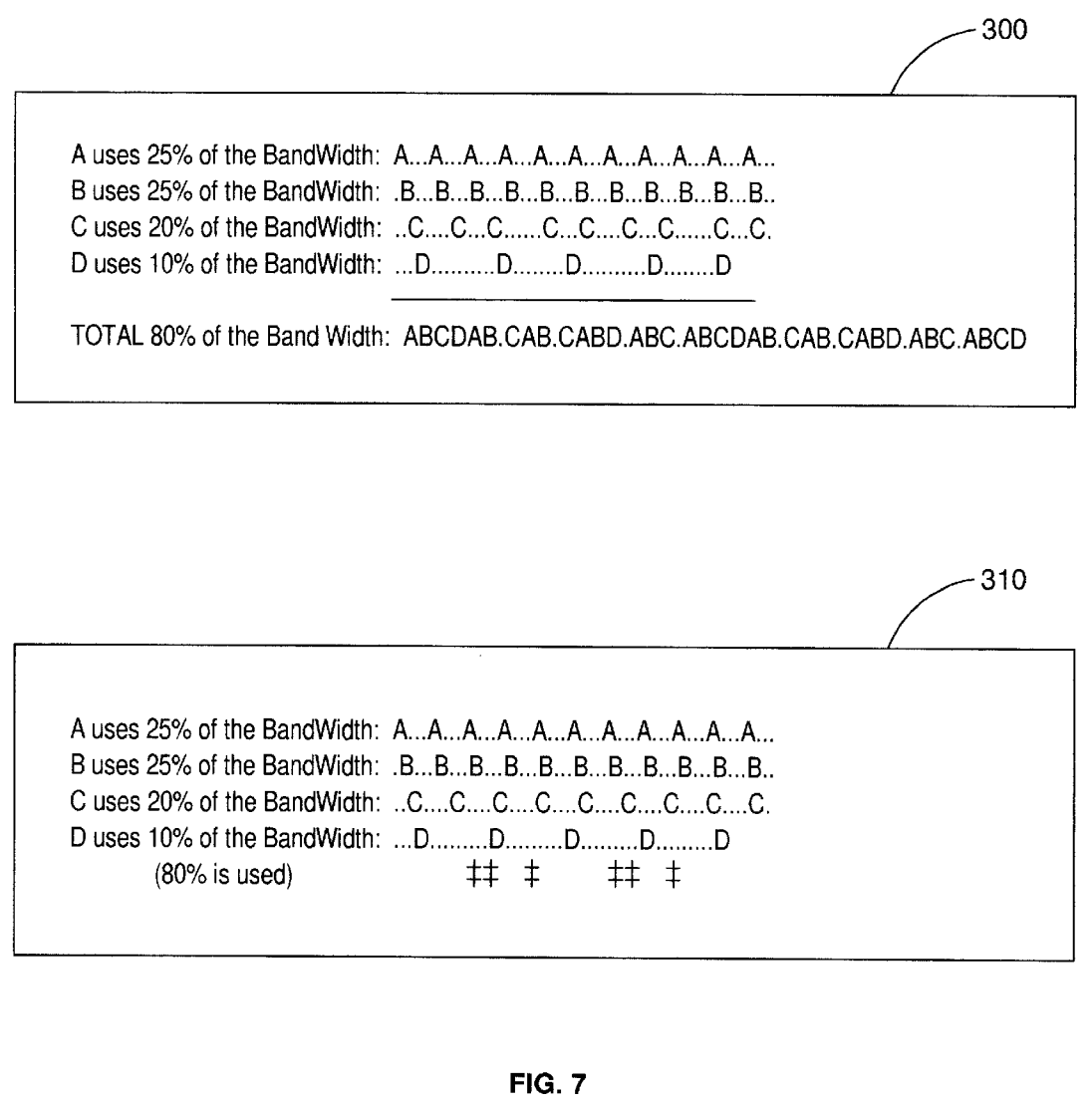

300

A uses 25% of the BandWidth: A...A...A...A...A...A...A...A...A...A...A...
B uses 25% of the BandWidth: .B...B...B...B...B...B...B...B...B...B...B..
C uses 20% of the BandWidth: ..C....C...C......C...C....C...C......C...C.
D uses 10% of the BandWidth: ...D..........D........D..........D........D TOTAL 80% of the Band Width: ABCDAB.CAB.CABD.ABC.ABCDAB.CAB.CABD.ABC.ABCD

310

A uses 25% of the BandWidth: A...A...A...A...A...A...A...A...A...A...A...
B uses 25% of the BandWidth: .B...B...B...B...B...B...B...B...B...B...B..
C uses 20% of the BandWidth: ..C....C....C....C....C....C....C....C....C.
D uses 10% of the BandWidth: ...D.........D.........D.........D.........D
(80% is used) ‡‡ ‡ ‡‡ ‡

| | |
|---|---|
| 1 | 6476336456246544562254355447442234334 2.3445246541232346565355637243453252 54 |
| 2 | 33221323133312531226121223213532.212242.141112223223114 . 14.221323 . . 211132 .1 |
| 3 | .11111221. . .1. .1212.1.22.2 .1 . . 122 . . 413211. . 112213 . . 121 . 12 . 122. 1. 32 .1. .1.21. . |
| 4 | 12.13 . . . . . . 2 . . . 2111 . . 1 . . . 1 . . . . . . 211.1.1 . . . . . . . . . . . . .1.1.11.11.21 . . 1. .2 . . .12. |

330

| | |
|---|---|
| 1 | 444444444444444444444444444444444444444444444344444233324444444444444444444 |
| 2 | 122222222222222222222222222222222222222222222222222222222222222222222222222 |
| 3 | . 1 .111111111.1. .111111111111111 . 1111111111111111111111111111111111111111111111111 |
| 4 | . .1 .1 . 1 . 1. 1 .1 .1 .1. 1 .1 .1 .1.1 . 1 .1 . 1.1 .1.1 .1. 1 .1. . . . . . .1 .1 .1 .1.1.1 .1 .1. 1 .1 .1 .1 |

FIG. 9

METHOD AND AN APPARATUS FOR SHAPING THE OUTPUT TRAFFIC IN A FIXED LENGTH CELL SWITCHING NETWORK NODE

RELATED APPLICATION

U.S. patent application Ser. No. 08/526,345 by Aline Fichou et al. entitled "A Method And Apparatus For Shaping the Output Traffic In A Fixed Length Cell Switching Network Node", filed Sep. 11, 1995, now U.S. Pat. No. 5,602,830, discloses a Time Division Multiplexing Table containing entries of cell positions in an output cell stream from a network node to a telecommunications network. At each connection accepted by the node, a computation is performed to find the best placement of the cells in the output stream for the connection which placement is reflected in the Table. The related application and the present invention are commonly owned by the assignee of the present invention.

BACKGROUND OF THE INVENTION

1. Field of the Invention

This invention relates to telecommunication networks. More particularly, the invention relates to a shaping method and apparatus in a network node adapter for traffic control of fixed length cell switching high speed networks.

2. Description of the Prior Art

The basic advantage of the new high bandwidth, low delay, fixed length cell based transfer mode techniques, such as Asynchronous Transfer Mode (ATM), is to allow multiplexing and switching of different types of information over the same network: data, voice, image, video, while optimizing the bandwidth and resources utilization.

Congestion control inside these networks is one of the major problems to be resolved. As the cells are short, no space is allocated in the header to enable error recovery for the cell payload. If one cell of the block has been lost or discarded by the network in case of network congestion, error recovery is performed at the higher-level by recovery protocols retransmitting the user data block. The error rate being extremely low in the internode links, cells lost because of random errors is not a potential problem. However, when a node discards cells for reason of traffic congestion detected, it is unlikely that these cells will come from a small number of logical data blocks. Discarding 1000 cells, if the average user data blocks length is 2K Bytes (a low estimate), sent as 43 cells, may cause the network to absorb a retransmission of 43,000 cells! This case indeed is the worse case when the 1000 messages come from 1000 different connections. That is why the protocols need to be efficient enough to limit the congestion problems in this type of networks.

In the ATM connection-oriented networks, the end-to-end traffic of data for one user, between the source and the destination, is represented by a Virtual Connection (VC); several Virtual Connections may be grouped in a Virtual Path (VP) that can be switched as a unit. The bandwidth is allocated dynamically as part of a connection setup signalling procedure that precedes end-to-end information exchange. At call admission time, the source user provides, in addition to the destination point, a set of parameters, called the traffic descriptors, which attempt to describe the traffic that will be generated onto the links. For instance, a mandatory descriptor is the peak cell rate of the connection, R. If this parameter is sufficient to fully describe Constant Bit Rate (CBR) connections, i.e., periodic stream of cells such as uncompressed voice, further parameters are necessary to describe Variable Bit Rate (VBR) connections such as those for video traffic. The burst of traffic is measured by the average cell rate and the average duration of an emission at the peak rate R in most of the high speed networks literature. As seen above, in ATM networks, cells may be lost or unacceptable delays can be induced in case of traffic congestion. Depending on the type of traffic conveyed over the ATM network, the first or the second just mentioned, behavior of the network, in case of congestion, may damage the quality of traffic over the virtual connections. For voice traffic, cells can be lost but a delay in transmission is unacceptable. When data is transferred on the virtual connection, the delay can be acceptable but not the cell loss. That is why the network guarantees a Quality of Service (QoS). The QoS guaranteed by a network is, in most cases, expressed in terms of cell loss probability and maximum end-to-end delay for a cell, independently of network topologies and protocols. One can note that the end-to-end delay between two users is increased if the end-to-end connection crosses different network entities (private or public carrier networks) which have their own protocols and traffic management.

In order to meet the QoS, the network nodes have to control the traffic congestion both at connection admission time and once the connections established.

At connection admission time, the access node has to decide if it can accept the connection or not. The acceptance decision is based on the actual load of the links, and analyzing of the traffic parameters of the connection. Moreover, the node has also to compute a path table to carry this overload of traffic through the different nodes. If no path is found, the call is rejected. It is important to note that the decision to accept a new call has to be taken not only if the network node estimates that the QoS for the connection will be met, but also if the added traffic will not have a significant impact on the QoS of all the connections already established.

A first control on traffic congestion, once the connection is established, is performed by a policing function implemented in a device, the policer, of the network access node adapter. The policer will detect and penalize the violation of the peak cell rate on the current traffic compared to the one required at call set up. Instead of the peak cell rate, another descriptor such as a Sustainable Cell Rate (SCR) (not yet a standardized parameter) can be used as a criterion for the policing function. In the following description, any reference to the peak cell rate can be replaced by SCR. The policing function is also referred in the ATM literature as the Network Parameter Control (NPC) or the Usage Parameter Control (UPC) depending if the source unit is a Network Node or a Customer Premise Node. Indeed, an efficient policing function should be transparent as long as the traffic characteristics provided by the source at call setup are met. When the number of cells received exceeds the number of cells corresponding to the peak rate negotiated at traffic establishment time, the policing function will discard or tag the user cells depending on the cell loss priority.

A second control of traffic congestion consists in shaping the output network node traffic by spacing the cells departures in such a way that the time between two departures of cells for a same connection is never below the minimal value negotiated at connection setup time. It has been shown that, on the average, the multiplexing of spaced cells tends to decrease the 'burstiness' of the aggregate traffic and that allows a better utilization of the network resources.

FIG. 1 shows the shaping principle applied to an input cell stream 1. The shaded cells have been sent by a first user and the cells marked with a cross have been sent by a second user. The result of shaping is shown with an output cell stream 2. The cells marked below with an equal sign (=) have been moved and the departure times between two cells have become more regular. The spacing of the cells is done in accordance with the bandwidth share required by the users. In the output cell stream 2, the departure time between two cells is smaller for the cells of the first user than for the second user because the first user has required a greater bandwidth share than the second user. Moreover, in the output cell stream the bursts of traffic have decreased. One can note that the groups of three cells of the input stream 1 have disappeared in the output stream 2.

The policing function is implemented in the access network nodes. The device implementing the policing function, the policer, is part of the high speed adapter cards. The policer controls and, if necessary, penalizes the traffic entering the network.

The shaping function is implemented in the devices accessing a network. The devices can be Customer Premise Nodes accessing an ATM network or a Network Node at the boundary of a first ATM network and intending to access another ATM network. The device implementing the shaping function, the shaper, is also part of the high speed adapter cards and controls the sending of the output traffic cells.

FIG. 2 shows a shaper and a policer implemented in a network node. Input lines 15 convey input cell streams (not shown) which are received by input adapters 10. In each input adapter 10 there is a policer which controls and penalizes, if necessary, the cell stream for each user. The cells are switched in a switch 30 and sent to output adapters 20. In each output adapter 20 there is a shaper which spaces the cells sent to output lines 25.

FIG. 3 shows a network topology to convey the traffic of users from a source unit 40 to a destination unit 60 through two networks 42 and 52. In these networks, the nodes 45 are the access nodes; the policers are implemented in these access nodes 45. The shapers are implemented in the source unit 40 and in a node 50 which is at the boundary of the first network 42 which accesses the second network 52. As the destination unit 60 may be a Customer Premise Node having implemented a policer, it is recommended a shaper in the node 55 be implemented at the boundary of the network 52.

Many policing schemes have recently been studied. Some of the most known are the leaky bucket; the jumping window; and the moving window as described by Raif O. Onvural in his book entitled "Asynchronous Transfer Mode Networks: performance issues", Artech House edition, published 1994. Without lack of generality, each policing function estimates one or more traffic parameters for a given period of time P. As this period of time P decreases, the policer may become non-transparent to users generating a traffic in conformance with the parameters negotiated at connection establishment time. On the other hand, as P increases, the policer takes longer to detect that the source exceeds the declared characteristics. However, the latter approach is more fair since it allows the user to generate a stream of cells that have short-term fluctuations. This is done at the expense of more memory requirements at the node level.

The only policing function proposed as a standard by the ITU (International Telecommunications Union), is the Generic Cell Rate Algorithm (GCRA). Details of the GCRA are given in the ATM Forum, "ATM User-Network Interface Specification", Version 3.0, 1994. The role of the GCRA is, for each connection, to monitor the traffic arriving upstream according to the cell period T (T corresponds to the inverse of the peak cell rate R) and a given tolerance $\tau$ on this period. Basically, a cell is assumed to be conforming if the time elapsed between the arrival of two consecutive cells (belonging to the same connection) is greater than or equal to $T-\tau$. If not, the cell is assumed to be non-conforming and is tagged and possibly discarded.

The policer discards cells not only because the source of traffic has violated the parameters negotiated at connection establishment, but also because of a distortion in the cell stream well known as "jitter" or Cell Delay Variation (CDV). This distortion is due to the queuing of the cells at each intermediate network node and more generally the multiplexing of the cells on the output lines. The magnitude of the "jitter" depends on many parameters: the connection peak rate; the peak rate of the other connections that share the same link; the link load; the number of nodes passed through etc. A consequence of "jitter" is to induce, as the user cells travel through the network, some distortion on the traffic parameters declared by the source upstream, especially, the instantaneous peak cell rate R' which may be modified and may pass beyond the value R declared by the source upstream at connection establishment time. In the worst case R'>R and the policing function with a short measurement interval (small period of time P) may take undesirable discarding actions. This is typically the case of the GCRA when the specified tolerance $\tau$, named Cell Delay Variation Tolerance (CDVT), is small. That is why the shaping function will buffer cells so that the departure rate from a node is less than the arrival rate. It has been shown that the multiplexing of spaced cells tends to decrease the "burstiness" of the aggregate traffic and that allows a better utilization of the network resources.

Policing and shaping control techniques should take into account the real-time constraints, as implemented in high speed network node adapters dealing with lines at several hundreds of Megabits per second. For example, the cell transmission time (cell time cycle) is about 2.7 $\mu$s for a line speed of 155.52 Mbps (OC-3), and less than 0.7 $\mu$s for a line speed of 622.08 Mbps (OC-12). Such times imply that the shaping and policing methods have a very short computing time not to pass the cell cycle. For instance, assuming (1) that only ten instructions are needed to both compute a cell transmission time and queue the cell to an output buffer and (2) each instruction takes no more than one time cycle, the execution requires from a processor more than 14 Mips (Million of instructions per second) devoted to this task, for an OC-12 output link. Usually hardware devices are needed and only simple computations (a few software instructions) and basic manipulations of cells are possible. As a consequence, shaping function will have to cope with a trade-off between complexity and performance.

Taking into account these above performance considerations, two shaping schemes are briefly examined hereunder. The schemes represent the state of the art.

The first scheme relies on a very basic principle. The shaping function sends a given number, p, of cells at a link speed C, and keeps "silent" (i.e. the cells are buffered) till $p(C/R-1)$. If this approach requires no computation nor complex operations at the cell level, the CDV induced is quite bad. The tolerance that should be accommodated at the GRCA level to accept all the cells would be typically $p(C/R-1)$. Some chips are available for this scheme and are described in "SARA Chipset Technical Manual" Transwitch, November 1992; "FRED Chipset ATM Overview" National Semiconductor, 1993; "Adaptation Layer Controller (ALC)" Fujitsu, October, 1993; "User's Manual $\mu$PD98401 Local ATM SAR CHIP (Preliminary)", NEC, June 1994, and "ATMIZER MegaCore" preliminary specifications 1993 by LSI Logic Corporation, Milpitas, Calif. describing a device having a "Pacing Rate Unit". These chips are used for terminals ATM connection rather than for ATM nodes. The chips use one or two cascaded leaky buckets to shape the output traffic. The solutions provided by these chips are not satisfactory for the ATM node, because they do not suppress, but only spread the bursts of traffic.

The second scheme, more sophisticated, is detailed in Eugene Wallmeier and Tom Worster article entitled "The Spacing Policer, An Algorithm For Efficient Peak Bit Rate Control In ATM Networks", published in the Proceedings of the of the XIV International Switching Symposium, Yokohama, Japan, Oct. 25–30, 1992. For an incoming cell of one connection, the time between two cell transmissions is such that the output peak rate is met, and the cell is queued to a list-of-cells that have to be sent at the same time tk. This list is referenced by the nth entry of a cyclic calendar with N inputs. A new entry of the calendar is sought at each cell time cycle, and the list-of-cells that have to be sent at time tn ($0 \leqq n < N$) if any, is moved and queued to an output list. In short, the following operations are done at each cell time cycle:

Computing the transmission time ti for the incoming cell belonging to connection i;

Enqueueing the cell to the list-of-cells at the nth ($0 \leqq n < N$) entry of the calendar;

Moving the list-of-cells of the current position m ($0 \leqq m < N$) of the calendar to the output list;

Sending the first cell to the output list;

Incrementing the calendar position;

Although this algorithm gives good results in terms of CDV, it is impossible (without the knowledge of the aggregate incoming traffic pattern) to predict the "jitter" induced by the spacer. Therefore, the tolerance that should be accommodated at the GRCA must be quite large to ensure a minimal cell loss probability.

The state of the art described above and all known existing shaping schemes rely on the same principle: they compute a cell transmission time at each cell arrival, which depends on both current time and the time when the last cell was transmitted. For this reason, these shaping schemes may be referred as cell-basis schemes.

Accordingly, there is a need in the art to provide in network node adapters transporting fixed length cells, a shaping method which controls and minimizes the CDV with a minimum of computing resources. Such a method would limit the bursts of traffic and thus the problem of traffic congestion in high speed networks. Such a method would also allow anticipation of the real traffic and thus avoid any penalization of the policers when accessing another network.

SUMMARY OF THE INVENTION

An object of the invention is a method and apparatus which provide high quality cell switching regulation in high speed telecommunication networks.

Another object is a method and apparatus for shaping cell positions in an output cell stream in an ATM network.

Another object is a method and apparatus for preparing in advance the departure of cells from a network node onto output lines of a telecommunication network.

Another object is a method and apparatus for preparing at connection time the departure of cells from a network node onto output lines of a telecommunication network.

These and other objects, features and advantages are achieved in a fixed length cell switching network by a shaping method implemented in an adapter supporting output lines. The method consists in scheduling in advance the departure time of the cells for each transfer of traffic between a source unit and a destination unit.

The shaping function is activated each time a change has occurred in the traffic supported (new traffic added, end of traffic, modification in the traffic already established) by a network node. This anticipated computing reduces significantly the number of operations performed in the cell cycle to send a cell onto an output line.

The method provides two lookup tables called an active and a standby calendar per one output line of the adapter. Each entry in the calendars store a traffic identifier representing the position of one cell in the output cell stream which will be read by a transmit device and sent onto an output line. At each change with the traffics supported, the standby calendar is filled up with a new output cell stream. Once the standby calendar is filled up it becomes the active one. The active calendar is continuously read and the transmit device is activated at each entry read to send onto the output line the cell corresponding to the traffic identifier.

The apparatus discloses in an adapter for a fixed length cell switching network node, the usage of a first lookup table, the active calendar, which is read by a device for sending the output sequence of cells over an output line to a telecommunications network. At each change with the traffics established in the node, a second lookup table, the standby calendar, is filled up with a new arrangement of the sequence of cells of all traffics established. Once the new arrangement is achieved, the active calendar is swapped to the standby one.

In a feature of the invention, the fixed length cell switching network node is an ATM network node supporting user connections: Virtual Connections and Virtual Path connections between the source unit and the destination unit.

With the hardware implementation of the invention as described in the preferred embodiment section having a calendar of 2**14 entries, the performance expected allow the support of OC3 lines and up to 100 swapping operations of the calendar per second. Such result allows up to 100 modifications per second in the set of connections particularly necessary to support for the ATM switched networks. A speed line up to OC12 can be supported with the corresponding size of the Random Access Memory units of the hardware implementation described below.

BRIEF DESCRIPTION OF THE DRAWINGS

FIG. 7 is a representation of the placement of connection entries in a calendar building with four connections.

FIG. 9 is a representation of the spacing of output traffic network node using the shaping method of the present invention.

DETAILED DESCRIPTION OF THE PREFERRED EMBODIMENT

Figure 1:
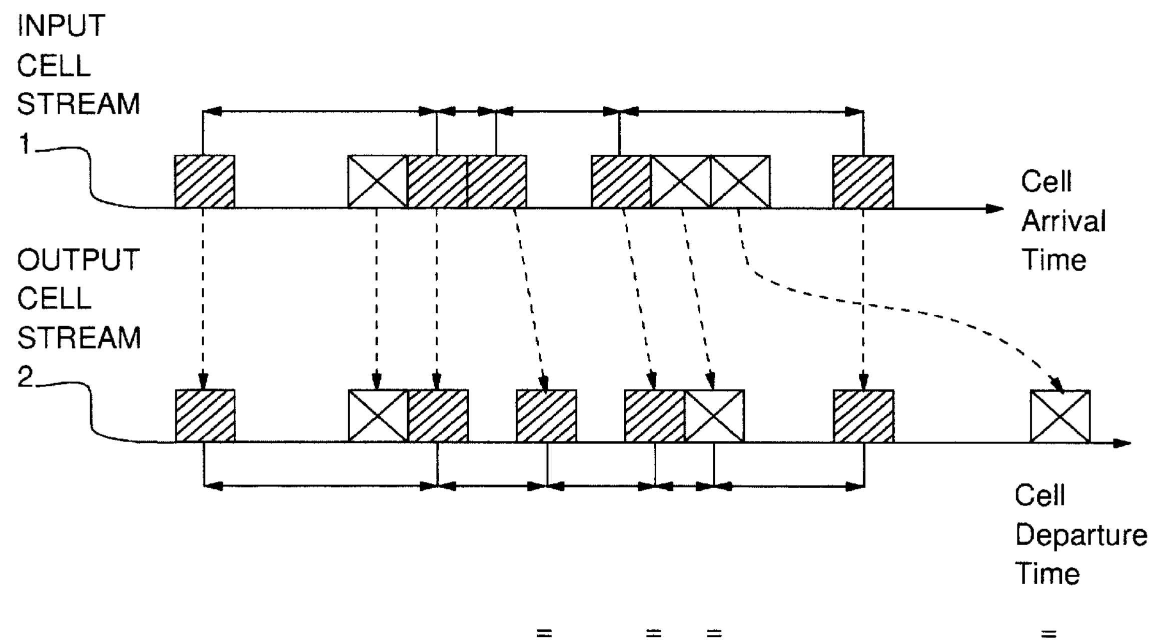
FIG. 1 illustrates a shaping principle applied to an input cell stream in forming an output cell stream.
Figure 2:
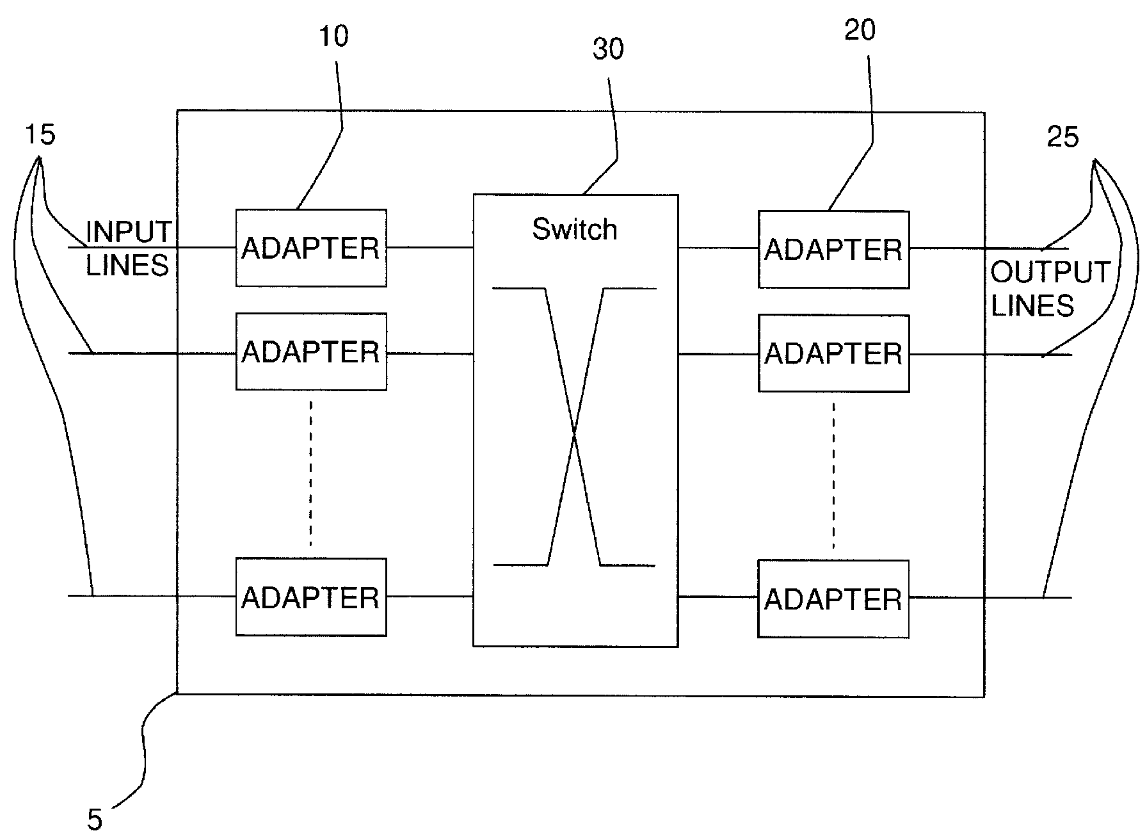
FIG. 2 is a block diagram of a policer and shaper in ATM network node adapters.
Figure 3:
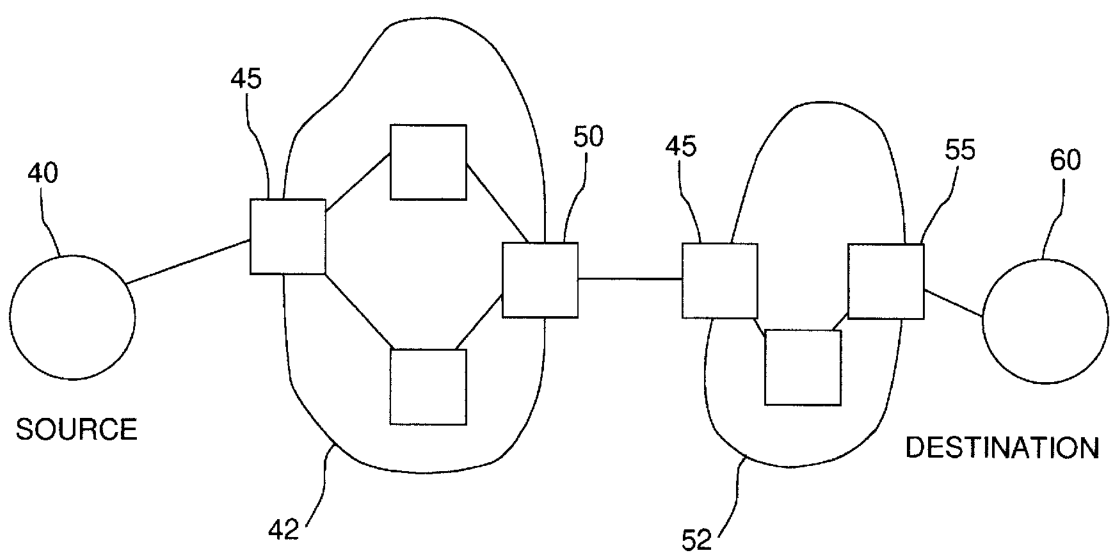
FIG. 3 is a block diagram of a shaper and a policer placed at the boundaries of ATM networks.

As shown in FIGS. 2 and 3, the shaping function of the invention is implemented in an output adapter 20 or the transmit part of the adapter of a fixed length cell switching network node supporting output lines 25. The node supports transfers of information for a given user between a source unit 40 and a destination unit 60. The transfers of information therebetween will be referred as user traffics or traffics in the following.

The method of the invention consists in preparing in advance the departure of the cells for all the traffic established in a network node and which will be sent onto the output lines. For each output line, the cell stream is stored in two lookup tables called the calendars: an active calendar and a standby calendar. In the calendars, one entry corresponds to a time unit required for cell departure. Each entry of the calendars is reserved for the departure of one cell of a given user traffic, if it is filled up with the identifier of the user traffic. The active calendar is continuously read. For each entry read, a cell of the corresponding traffic is sent onto the output line. If the entry is empty, an elapsed time corresponding to the cell departure time is sustained by the transmit device or an idle cell is sent onto the output line which will be discarded by the remote device. When the last entry of the calendar is read, the reading restarts at the first entry. At each change with the user traffics (new traffic added, one traffic terminated or one traffic modified), the second calendar, the standby calendar, is prepared. The entries in the standby calendar are reserved for the traffics established in such a way that the Cell Delay Variation (CDV) is minimal. The CDV is induced by the variation between the final placement of the entries compared to the ideal one. The ideal placement of the entries for one user traffic corresponds to the entries equally spaced with a number of entry corresponding to the bandwidth share required by said traffic. If one entry of the ideal placement is already reserved for another traffic, there is a collision. The entry finally reserved will be the one inducing a minimum CDV on the placement. The method of placement to solve the collision with a minimum CDV is explained hereinafter in connection with FIG. 10. Once ready, the standby calendar is swapped to the active calendar.

Figure 13:
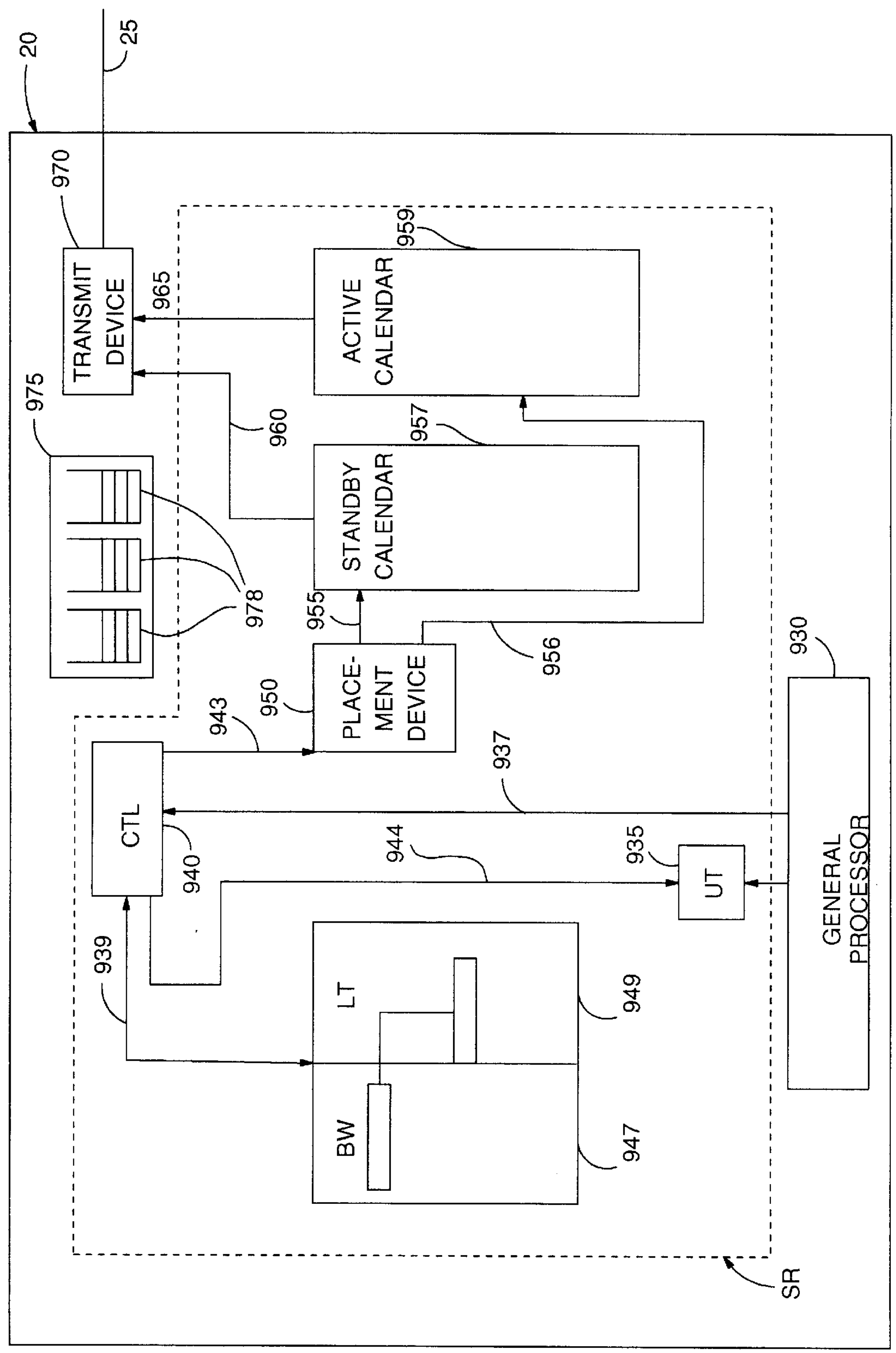
FIG. 13 is a block diagram of apparatus implementing the principles of the present invention.

The preferred embodiment of the shaper is described in FIG. 13. The shaper is implemented in the adapter 20 supporting the output lines 25 in the network node. A general processor 930 fills up a User Table (UT) 935 containing in each entry a traffic identifier and the number of entries to be reserved in the standby calendar for the said traffic or connection. This operation is performed each time a traffic is added, changed or removed. The general processor 930 which is not part of the shaper, sends to a control device 940 via the link 937, a request for starting an update of the standby calendar as soon as the User Table is ready. Then, the control device 940 sorts the data related to the traffics and updates two tables thru link 939. a BandWidth (BW) table 947 contains the traffic identifier in the descending order of the bandwidth share and points to a LinkTable (LT) 949, the second table, containing all the traffic identifiers with the same bandwidth share. The control device 940 sends through link 943 to a placement device 950 (to be described in connection FIG. 10) the data to update a STANDBY CALENDAR 957. These data are used by the placement device 950 which computes all the entries corresponding to one traffic. The data are sent to the STANDBY CALENDAR via link 955. In parallel, an ACTIVE CALENDAR 959 sends in sequence the data to a transmit device 970, which is not part of the shaper, the traffic identifier being sent through link 965 to the transmit device 970. In a storage 975, the cells for each traffic are stacked in queues 978. The transmit device fetches the cell corresponding to the traffic identifier which is in the storage 975 and sends it onto the output line 25. When the entry of the calendar is zero the priority traffics in other queues 978 are analyzed by the transmit device. If there is no cell to send, an elapse timer (not shown) is set or an idle cell is sent. The STANDBY CALENDAR 957 once filled up starts sending the entries to the transmit device via link 960. This second transfer of data is then taken as the only one by the transmit device 970. When the data are received thru link 960, the link 965 is disregarded and vice-versa. The STANDBY CALENDAR has been swapped to become the ACTIVE CALENDAR. In parallel, at the same time, a placement device 950 detects the end of the first calendar 957 and in consequence, starts filling up the second calendar 959 sending data thru a link 956. The reverse operation happens when the calendar being filled up is ready.

Figure 4:
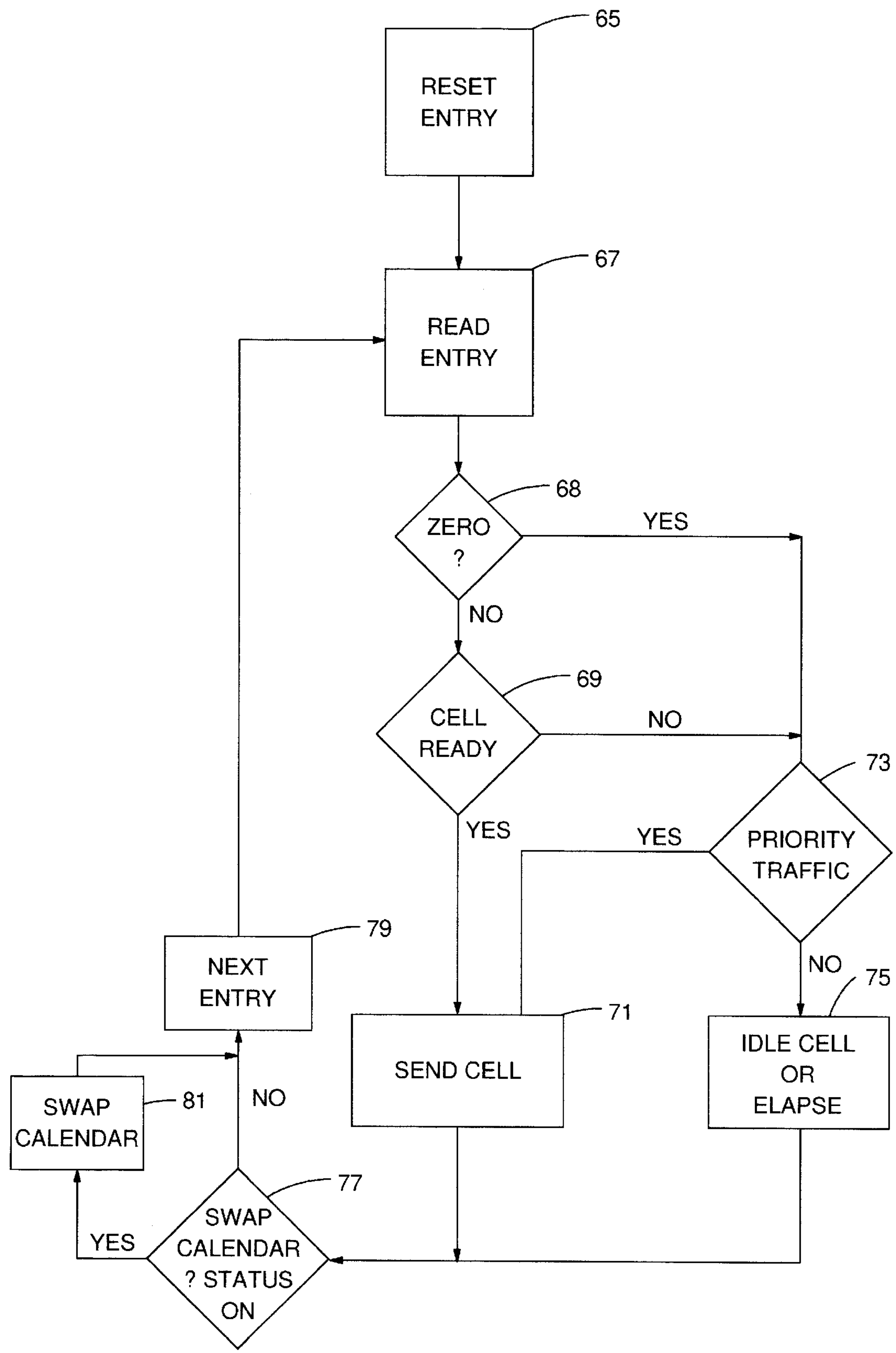
FIG. 4 is a flow diagram incorporating the principles of the present invention for reading an active calendar and sending the cells as an output cell stream over a propagation medium.

The method implemented to read the calendars 957 and 959 and for the transmit device (see FIG. 13) is described in FIG. 4. A step 65 initializes a pointer to the first entry in the active calendar. Step 67 reads the corresponding entry and requests for a cell of the corresponding user (traffic) identifier for identifying the connection. If the entry is zero, checked by a test in step 68, no user traffic is actually scheduled in this entry of the calendar and the process goes on with step 73. If the result of test 68 is no, a test 69 is performed to check if one cell is ready to be sent in the waiting queue of the traffic. If yes, the cell is sent in step 71 over the output line. If no cell is ready to be sent, a test 73 is performed to check if priority traffic has been provided to the system. If yes, the cell of said priority traffic is sent in the step 71. If no, no cell at all has to be sent, and a step 75 is performed. In step 75 there are two possible implementations for no cell sent: either an elapse timer is set corresponding to the cell departure time or an idle cell is sent. The specific idle cell will be destroyed by the receiving terminal. After cell departure time is over, a swap calendar status on test is performed in a step 77. If the result of test 77 is yes, which means that a calendar swap status is pending, then the swap between standby and active calendar is performed in a step 81 and the process restarts as if the answer to test 77 was no. The entry in the calendar is incremented in a step 79 and the process returns to step 67.

Figure 5:
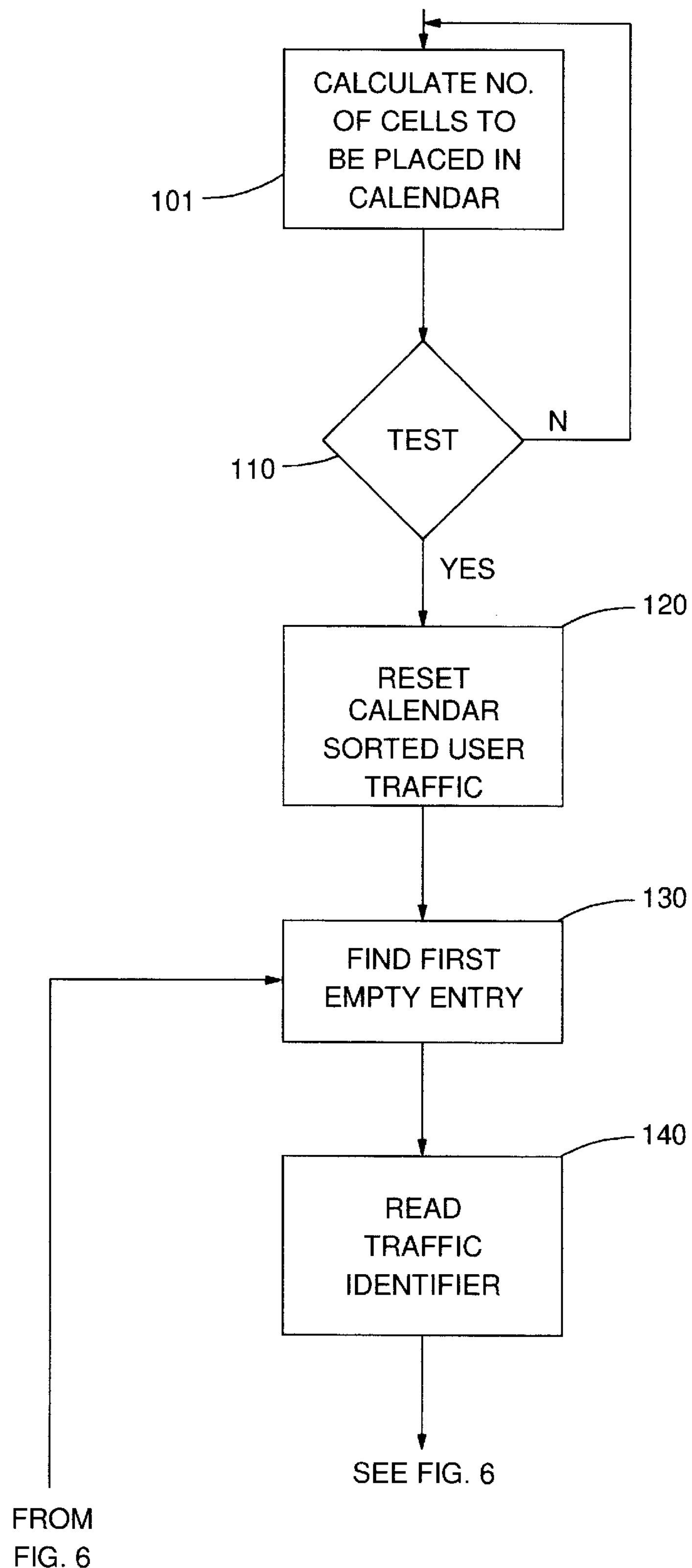
FIG. 5 is a flow diagram incorporating the principles of the present invention for building a standby calendar for a network node in which connections are sorted in the calendar in descending order of their bandwidth share.
Figure 6:
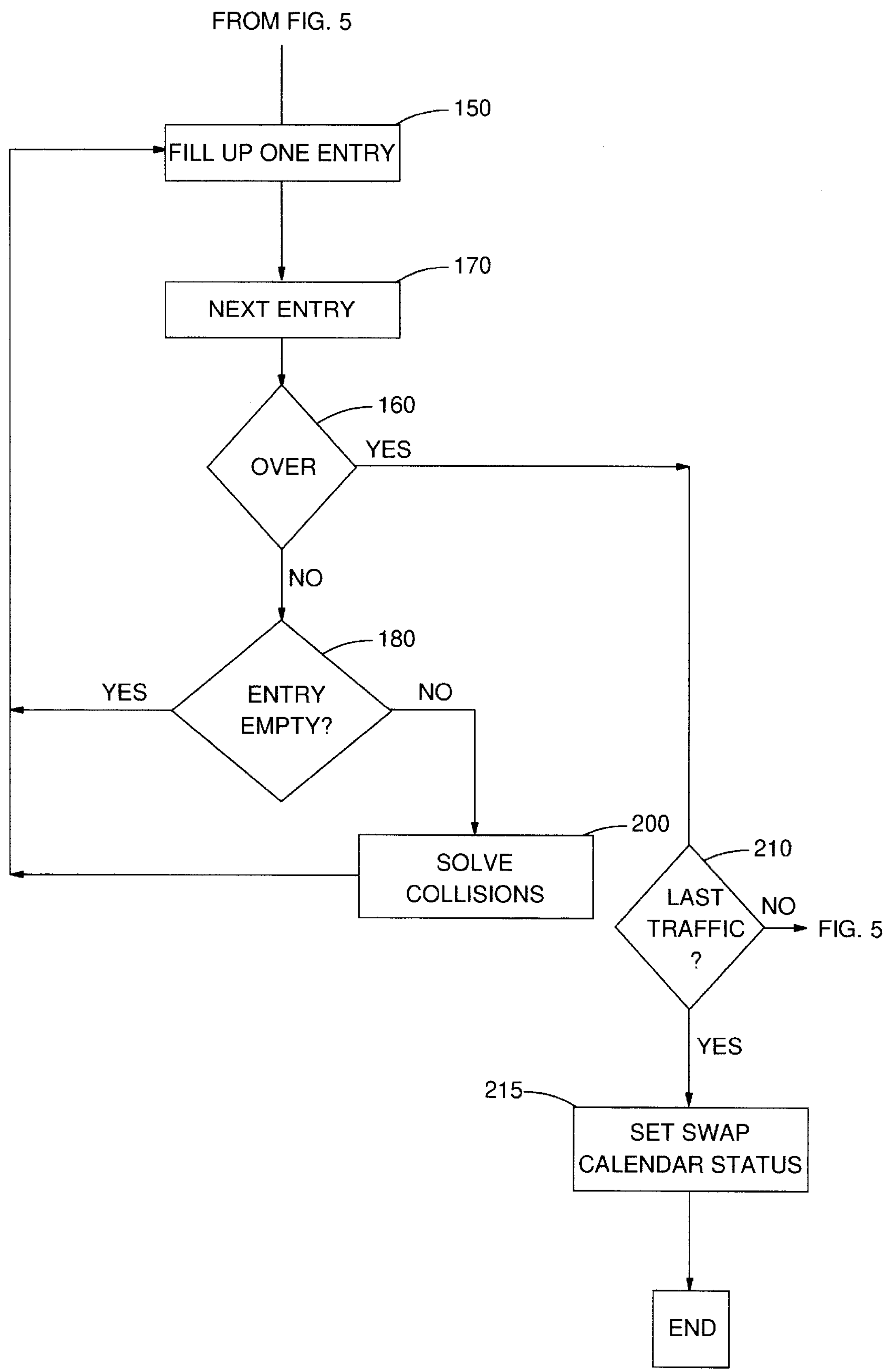
FIG. 6 is a flow diagram describing the placement of entries in a calendar corresponding to each connection processed by a fixed length cell switching network node.

FIGS. 5 and 6 illustrate the method for preparing the standby (or next active) calendar. Upon request of the general processor 930 (see FIG. 13) which has just updated the User Table 935, a new standby calendar is prepared. A first step 101 consists in calculating the number of cells to be placed in the calendar for the traffic. When the calculation is over a test 110 is performed to determine if number of cells has been calculated. If the answer is not, recalculation continues. If the answer to test 110 is yes, the standby calendar is reset and a list of sorted user traffics is created in a step 120. The sorting criterion is the traffic bandwidth share in descending order. In a step 130, the first step to fill up the calendar is to find the first available slot in the calendar. In a step 140, the traffic having the greatest bandwidth share is identified and in a step 150 (see FIG. 6) the first entry is filled up with the identifier of said user traffic. The next ideal entry for said traffic is considered in a step 155. If, the end of calendar is reached, all the entries have been reserved for said user traffic, the answer to the test 160 is yes then a test 210 is performed. If the user traffic is the last one in the list of traffic, the calendar is ready to be swapped and the status 'calendar ready to swap' is set in a step 215. This means that the standby calendar is ready to be swapped to the active calendar. If the answer to the test 210 is no, there is another traffic for which the entries need to be reserved in the calendar and the process returns to the step 130 (See FIG. 5). Continuing in FIG. 6, if the answer to the test 160 is no, all the entries have not been reserved for the current traffic. A test is done in a step 180 to determine if the entries in the calendar are empty. If the answer to the test 180 is yes, the process returns to the step 150, the entry is filled up with said traffic identifier. If the answer to the test 180 is no, a collision determination between cells needs to be solved in a step 200 with the method to be described hereinafter in connection with FIG. 10. The process continues with step 155 to achieve the placement of the entries for one traffic then for all the traffics and set the status 'calendar ready to swap' in the step 215.

The Cell Delay Variation (CDV) for a given traffic used in the method of the invention is considered as depending not only on the deviation of the final departure placement of cells versus the ideal placement but also the bandwidth share required by the connection. It is assumed that for the same deviation of the entries reserved for two traffics, from their ideal positions, the CDV will be greater (and thus more sensible for the control of traffic congestion in the network) for the traffic using a larger bandwidth share than if the traffic requires a smaller bandwidth share. In consequence, the entries for the traffics having the highest bandwidth share are reserved first in the calendar. Then for each traffic, each entry is placed, following the ideal positions and when the positions are not empty, because it is already reserved for another traffic, the nearest free entry is taken. Many calendar building operations using the above method of placement, based on various test cases varying the number of traffics and their placement of entries in a large range, have been tried. These simulations have highlighted that a right-left search around the ideal position gives always a better result than right-only search. Assuming I is the ideal interval between two entries reserved for one traffic in a calendar by the placement device, corresponding to the bandwidth share negotiated at traffic establishment time and i, the minimal interval between two entries reserved for one traffic in a calendar by the placement device, the CDV for said traffic is expressed by:

$$(I-i)/I \qquad \text{(expression 1).}$$

Figure 8:
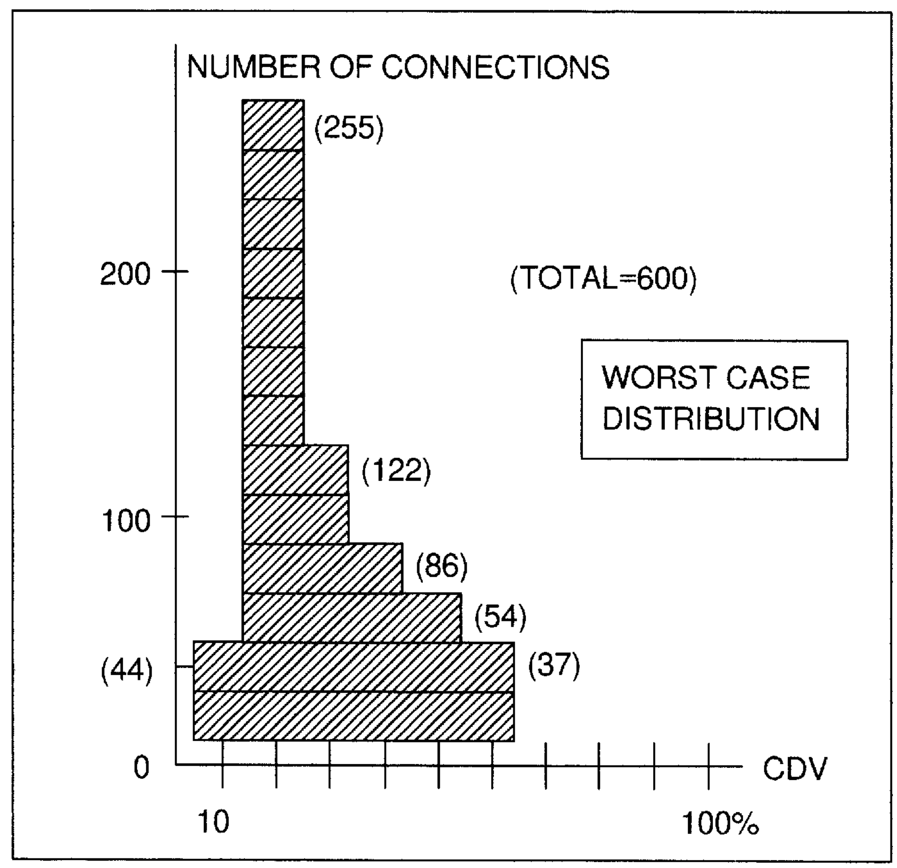
FIG. 8 is a distribution diagram of Cell Delay Variation (CDV) values obtained by a placement simulated for 600 connections.

According to expression 1, the results of tests performed applying the method of the invention provide a distribution of the CDV value centered around 10%. The worst case is found with a test case using 99.8% of the slots (or bandwidth) with many connections having a number of slots close to each other, but not equal. The CDV distribution of the 600 connections calendar built with this test case is shown with the distribution diagram of FIG. 8. In FIG. 8, 255 connections have a CDV centered on 20%.

Figure 10:
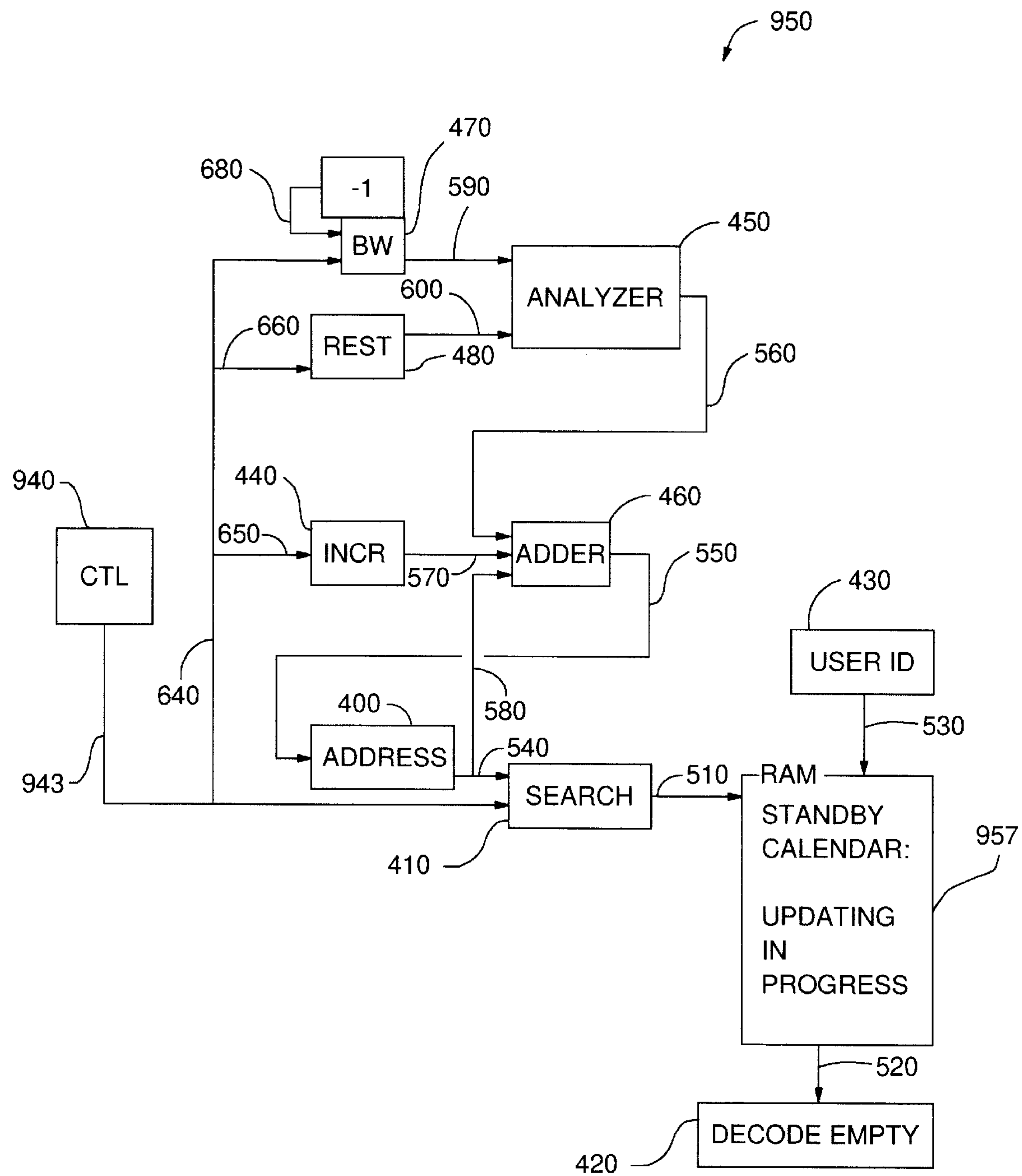
FIG. 10 is a block diagram of a device for the placement of entries in building a calendar.

FIG. 10 represents the placement device 950 (see FIG. 13) which implements the placement method of the entries of one given traffic in the standby calendar. At one point in time the control device 940 sends a command of 'search placement for said traffic' thru a link 943 to a counter SEARCH 410. The counter SEARCH points to one address of the calendar 957 read in a register ADDRESS 400 thru a link 540, which is the current address to be searched. The entry read at this address of the calendar is sent thru a link 520 from the calendar 957 to a DECODE EMPTY device 420 which checks if the entry is empty. If the entry is empty, the user identifier read in a buffer 430 is sent to the calendar via link 530 and is written in said pointed entry of the calendar. If the pointed entry of said calendar is not empty, there is a collision and the entries +1, −2, +3, −4 etc . . . are successively decoded until an empty entry is found. When found, the user identifier value is written as above. The current address read in the ADDRESS register 400, which is the address to be searched by the counter 410, has been sent thru a link 550 from an ADDER 460 where are added the following values: a fixed increment sent from a register INCR 440 sent via a link 570; a value in an analyzer 450, which is zero or +1, sent via a link 560 and the preceding value of the address stored in the ADDRESS register 400 and resent to the adder 460 via a link 580. The register 440 contains the increment value which is the value of the ideal interval between two entries. This value is computed by the Control Device 940. Such computed value is the quotient of a division of the total number of entries in the standby calendar, 214 for our example, by the number of entries to be reserved in the calendar for said traffic. When starting the placement of said traffic, the control device sends thru link 943 a quotient, a remainder and a divisor of the division described above thru the link 943. The quotient is sent internally to the placement device, thru a link 640 and then thru a link 650 to the increment register 440 where it is stored. The remainder is sent internally to the placement device, thru the link 640 then thru a link 660 where it is stored in a register REST 480. The divisor, which is the number of entries to be reserved in the standby calendar for said traffic, is sent internally to the placement device, thru the link 640 to be stored in a decrementer BW 470. The control device, once these initializations are done for one traffic, sends a command of 'search placement for said traffic' to the SEARCH counter 410. When search operation is performed each time an entry is written in the standby calendar for said traffic, the decrementer 470 is decremented of 1 via a link 680. An analyzer 450 combines the values of the decrementer 470 and the register 480 thru two links, respectively 590 and 600. The analyzer decides whether to send zero or + one to the adder thru the link 560. The analyzer will send the value +1 as many times as the number stored in the register REST. The distribution of zero and +1 is regular between all the entries to be reserved in the calendar for one given user traffic. Considering that for N entries to be reserved for a given user traffic, if the remainder in the register REST is r, the quotient being q in the register INCR in the division of the total number of available entries in the calendar by the number of entries N for said traffic, then the analyzer will send +1, one time on (N−r)/r. This implies that one entry upon (N−r)/r reserved for said traffic will be spaced from the next one by q+1, the remaining ones being spaced from the next one by q. In the case where (N−r)/r is not an integer, the integer immediately less than this number is taken. For a given traffic, the process of placement of entries in the calendar stops when the number of entries to be placed in the calendar stored in the decrementer 470** is zero.

In the preferred embodiment, active and standby calendars of 214 entries are considered as sufficient to support OC3 speed lines. Each calendar entry is scanned at the cell departure beat over the output line which is close to 2.7 μseconds. The chief parameter that governs the number of entries of the calendar is the smallest share of the medium bandwidth that can be attributed to a single connection. For instance, a calendar for an OC3 which has a payload bandwidth of 149.760 Mbps may require 2 14 entries since the smallest increment of payload given to one user is roughly 149.106/16.103 or 9 kbps which is low enough to accommodate a voice channel (compressed 64 kbps channel). Another parameter that may have to be considered is the granularity in the adjustment of the bandwidth the network manager may want to control. If there is no special restriction imposed on the sharing of the bandwidth (other than what has just been said on the granularity and on the minimum increment), there is no perfect solution (CDV=0) because a situation may always be found where at least two users are competing for the same departure time of a cell.

The result of the method of the invention for the placement of the entries of one user traffic minimizing the CDV is illustrated in FIG. 7. referring to FIG. 7(*b*) Table 310 shows the ideal placement of the entries to be reserved for user traffics A, B, C and D, already ordered in the descending order of their bandwidth share. The traffic entries are placed in the ideal entries where the CDV is null. After this placement, 20% of the bandwidth share is unused and there are 6 cases of collisions (indicated with the symbol "∓") where connections are competing for the same departure time. The CDV value is increased to assign for the entry of connection C the next closest position around the ideal one which will be free. The same process is applied to connection D. referring to FIG. 7(*a*) Table 300 illustrates the final placement of the connections entries in the calendar once the collisions have been solved.

Compared to the chips cited above as prior art, the solution brings a significant advantage in suppressing the 'burstiness' of the output traffic. In FIG. 9 a sample of input and output data flows illustrate the shaping of the traffic with the solution of the invention. With this sample, 4 connections share 75% of the bandwidth. Connection 1 has nominally 40% of the bandwidth; connection 2 has 20%; connection 3 has 10%, and connection 4 has 5%. The table 320 shown in FIG. 7(*a*) illustrates a random input sampling and table 330 shown in FIG. 9(*b*) the shaped output sampling. Each column in the tables is the sampling cells actually accumulated or sent over a standardized 10 cell period of the output line. Table 330 shows that the output traffic is much more regulated, due to the action of the shaper, than the input traffic: bursts and spaces between cells are improved.

Figure 11:
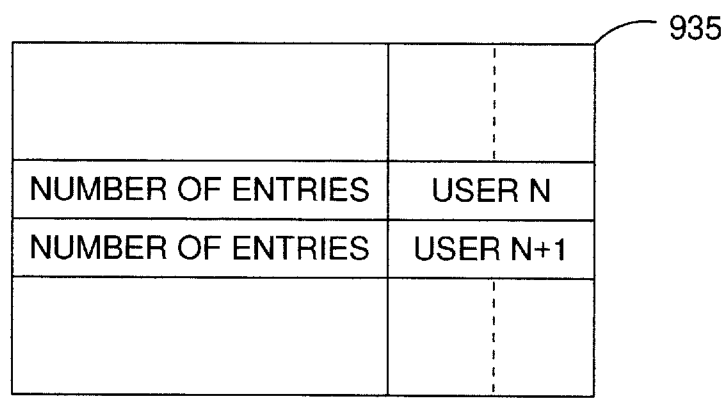
FIG. 11 is a representation of a User's Table for use in managing network traffic

The interface with the device in charge of the adapter and the shaper is the User Table (UT) as illustrated in FIG. 11. This table has as many entries as the number of traffics to manage. Whenever the general processor of the adapter wants to update a calendar, it has just to update the User Table at the entry corresponding to the traffic. Each entry contains the traffic identifier and the number of entries that must be reserved for said traffic in the next calendar. Once the User Table is updated, the shaper is activated to perform a re-building of the standby calendar which will replace the active calendar.

Figure 12:
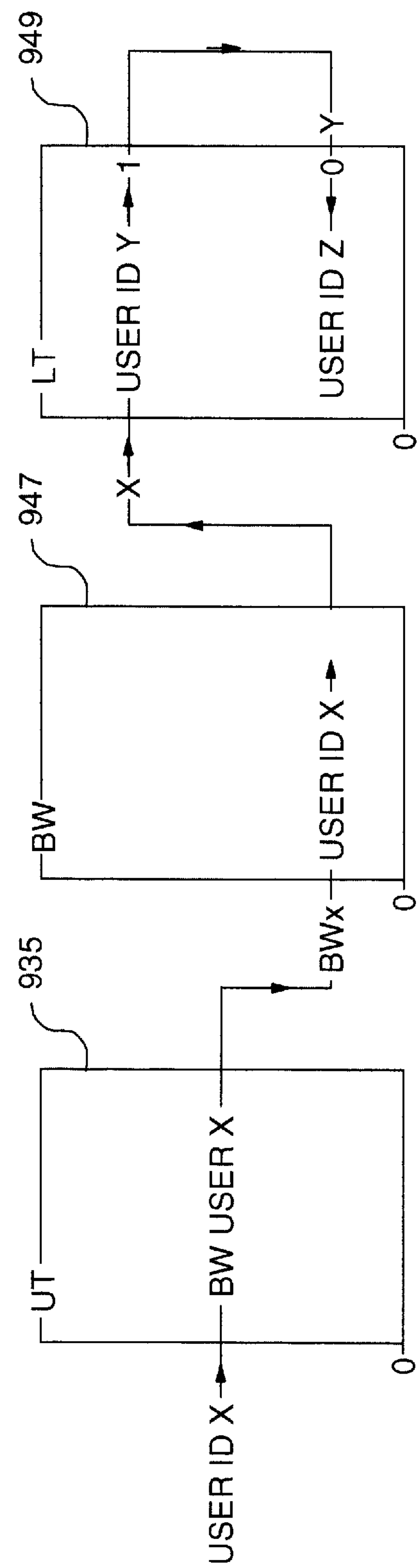
FIG. 12 is a representation of chaining of the User's Table, a bandwidth table and a link table for the sorting of connections according to bandwidth requirements for the connection in building a calendar.

The tables described in FIG. 12 and used in the preferred embodiment show how the user traffics which have a larger sharing of the medium bandwidth have their entries placed first in the calendar. Thus, the sorting of the connections is based on the number of necessary entries. The traffics with a higher bandwidth share have a greater number of entries reserved in the calendar. To achieve this state, two extra tables are added to the User's Table 935 and prepared by the control device 940 (in FIG. 13) before the updating of the standby calendar may start. The first one is the bandwidth table (BW table) 947 (See FIG. 13) which has 214 entries. At each re-computation of the calendar this table is first cleared, then the User's Table (UT) is scanned. At each UT entry where a non zero bandwidth value is found, an entry is done in the BW table with the user identifier corresponding to the traffic having this bandwidth. Obviously, there may be many connections having the same bandwidth value share thus competing for the same entry in the bandwidth table. This is solved with a third table, the link table (LT table) 949 (See FIG. 13), which links the traffics at the same bandwidth. Because the user traffic identifier are unique, no other conflict may occur in the LT table which has 213 entries like the UT. The building of the calendar starts with the generation of the BW and LT tables which are then read by the control device of the shaper 940 to place all the traffics starting with the one having the highest bandwidth share to comply with the method of the invention.

The high speed adapters will need in the shaper a set of two calendars per output line. The same hardware implementation as described above is used and the set of two calendars repeated as many times as the number of output lines. The size of the calendar is always related to the bandwidth of the line. As stated previously, for a line speed of 150 Mbps, a 16K (2**14) entries calendar is used. For a line of 45 Mbps, a 8K entries calendar provides also a satisfactory level of granularity. In a more sophisticated implementation of the invention, the size of the calendar can be settable by program or command.

In summary, this invention achieves high quality cell switching traffic regulation in cell switching nodes of a telecommunication network. The principle is to prepare in advance the departure of cells on output lines from the switching nodes. There are two tables to place the cells on the output lines, one table is the active table read for the departure of cells. The other table is the standby calendar prepared at each change at the node for new connections or a change in connection parameters, etc. Once the standby calendar is filled, the node output is taken from the standby calendar which becomes the active calendar. The former active calendar assumes the state of standby calendar. The invention improves the quality of service on the network by reducing bursts while preserving the quality of service.

While the present invention has been described with to several embodiments, the description is illustrative of the invention and is not to be construed as the limiting the invention. Various modifications may occur to those skilled in the art without departing from the spirit and scope of the invention.

We claim:

1. A method for shaping output traffic in a transmit part of a network node adapter for receiving and storing input cells in a storage unit and equipped with output lines; said network node adapter supporting fixed length cell switching user information traffic between a source unit and a destination unit; said source unit sending at user traffic establishment time a bandwidth share required for such traffic; said network node adapter being equipped with a transmit device which reads the cells in the storage unit and sends them onto said output lines; said method comprising the steps of:

A) defining an active calendar lookup table and a standby calendar lookup table for receiving entries for one of said output lines, each entry in the calendars representing the position of one cell in the output cell stream to be sent onto said output line;

B) filling up the standby calendar with a new output stream at each change with the user traffic supported by the network node adapter, and once said standby calendar is filled up, swapping the standby calendar to the active calendar; and C) continuously reading the active calendar and activating the transmit device to send onto the output line the cell corresponding to the user traffic read.

2. The method of claim 1 wherein the step C) includes the following steps:

i) reading one entry of the active calendar and sending the user traffic identifier read to the transmit device;

ii) detecting if the standby calendar is ready to swap and if ready, continuing reading the same entry in the standby calendar; if no status of standby calendar ready to swap is detected, continuing with the active calendar; when reaching the last entry of the active calendar, restarting at the first entry.

3. The method of claims 1 or 2 wherein the step B includes the following steps:

i) choosing user traffic from source units in decreasing order of their bandwidth share;

ii) reserving for each user traffic the entries corresponding to the smallest cell delay variation versus optimal placement of such traffic corresponding to said bandwidth share; and iii) setting the status for standby calendar ready to swap once the last user traffic reservation is performed in the standby calendar.

4. The method of claim 3 where the reservation of the entries in the standby calendar includes the following steps:

i) ordering the user traffic in the standby calendar in decreasing order of their bandwidth share;

ii) reserving the entries corresponding to the bandwidth share requested at user traffic establishment time for each user traffic; and iii) finding the nearest right-left searched free entry in the standby calendar in case of cell collision in the traffic.

5. The method of claim 4 wherein the sorting of the user traffic occurs in decreasing order of their bandwidth share and includes the following steps:

i) preparing a User Table containing for each user traffic a user traffic identifier and a number indicative of entries to be reserved for the user traffic upon each change with the user traffic; and iii) preparing first and second tables containing the user traffic identifiers, the first table containing a list of different user traffic sorted in decreasing order of their bandwidth share and a pointer to the second table; the second table containing for each entry pointed by said first table a list of user traffic having the same bandwidth share.

6. The method of claim 5 wherein the fixed length switching network is an Asynchronous Transfer Mode (ATM) network and the user traffic are Virtual Connections or Virtual Path Connections.

7. The method of claim 6 wherein before placing the entries in the standby calendar as required by the bandwidth share required at user traffic establishment time and before solving possible cell collisions in the user traffic, the following steps are performed:

i) dividing the total number of entries available in the standby calendar by the number of entries to be reserved for one user traffic; r being the remainder and q the quotient of said division;

ii) reserving all the entries for said user traffic spaced with q entries in the standby calendar from the following entry, if r is equal to zero;

iii) reserving r entries spaced with q+1 entries in the calendar from the following entry for said user traffic, if r is different from zero; the remaining entries to be reserved for said traffic being spaced with q entries in the calendar from the following entry for said user traffic; and iv) regularly distributing entries in the standby calendar spaced with q and q+1 entries from the next entry for said traffic.

8. The method of claim 1 further including the step of:

setting a timer with an elapsed time corresponding to the cell departure time, if the active calendar entry read in step C is unoccupied.

9. The method of claim 1 further including the step of:

sending an idle cell over the output line if the active calendar entry read in step C is unoccupied.

10. The method of claim 1, in which the size of the calendar is settable by program or command.

11. An apparatus implementing a shaping function in a fixed length cell switching network node adapter supporting output lines, comprising:

a) a transmit device able to send cells onto the output lines for a given user traffic;

b) first means for storing for storing entries, each entry containing a user traffic identifier and, once filled up, for sending data onto a first link to said transmit device;

c) second means for storing entries, each entry containing a user traffic identifier and, once filled up, for sending data onto a second link to said external transmit device;

d) third means for storing for each user traffic in descending order of their bandwidth share, the user traffic identifier and the number of entries to be reserved in the first means;

e) control means to read in the third means when a request is received from an external processor; and f) means for sending the user traffic identifier for each user traffic as entries to the first and second means, the entries being the ones to be reserved in said first and second means for user traffic cells departure in an optimized order, the entries being sent to the first means if the second means is sending data onto the second link to said transmit device; or the entries being sent via a third link to the second means if said first means is sending data towards said transmit device.

12. In a fixed length cell switching network, a switching device for scheduling in advance the departure of data cells for each transfer of traffic between a source unit and a destination unit in the network, said traffic being received from one or more input lines to the device and being transmitted through one or more output lines from the device, said device comprising:

a) storage means for receiving a stream of data cells from an input line;

b) an active calendar and a stand-by calendar for storing a plurality of traffic identifiers representing the position of each cell in the data stream;

c) a transmit device for receiving the traffic identifiers in the active calendar and transmitting the cells in the data streams onto the output lines;

d) means for filling the stand-by calendar with traffic identifiers for each cell in a data stream when a change in traffic occurs on the input lines; and e) means for switching the transmit device to the stand-by calendar for transmission onto the output lines when the stand-by calendar is filled up.

13. The switching device of claim 12 further including a placement device for computing entries into the active and stand-by calendars.

14. The switching device of claim 13 further including a control device which sorts cell data related to traffic on the input line using a bandwidth table and a link table, the bandwidth table listing traffic identifiers in descending order of bandwidth share and the link table assembling all of the traffic identifiers having the same bandwidth share; and means supplying the link table data to the control unit.

15. The switching device of claim 13 further comprising:

a) a user table for storing a plurality of traffic identifiers for each data cell and the number of entries to be reserved in the stand-by calendar for the traffic associated with the data cells.

* * * * *